United States Patent
Liu (10) Patent No.: US 8,040,804 B2
(45) Date of Patent: Oct. 18, 2011

(54) METHOD OF FLOW CONTROL FOR IUB-INTERFACE, APPARATUS AND BASE STATION

(75) Inventor: Wei Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 137 days.

(21) Appl. No.: 12/372,559

(22) Filed: Feb. 17, 2009

(65) Prior Publication Data

US 2009/0147680 A1  Jun. 11, 2009

Related U.S. Application Data

(63) Continuation of application No. PCT/CN2007/070462, filed on Aug. 14, 2007.

(30) Foreign Application Priority Data

Aug. 17, 2006 (CN) .......................... 2006 1 0062179

(51) Int. Cl.
*H04J 1/16* (2006.01)

(52) U.S. Cl. ....................................................... 370/231

(58) Field of Classification Search .................. 370/229, 370/230, 231, 233, 235, 232
See application file for complete search history.

(56) References Cited

U.S. PATENT DOCUMENTS

| 6,424,624 | B1 | 7/2002 | Galand et al. |
| 6,564,061 | B1 | 5/2003 | Guo et al. |
| 7,782,774 | B2 * | 8/2010 | Cheriton ........................ 370/232 |
| 2001/0004599 | A1 * | 6/2001 | Dokko ............................ 455/452 |
| 2002/0136164 | A1 * | 9/2002 | Fukuda et al. ................. 370/230 |
| 2006/0159016 | A1 * | 7/2006 | Sagfors et al. ................. 370/230 |
| 2006/0159098 | A1 * | 7/2006 | Munson et al. ................ 370/394 |
| 2006/0224659 | A1 * | 10/2006 | Yu .................................. 709/201 |
| 2007/0280245 | A1 * | 12/2007 | Rosberg ......................... 370/392 |
| 2009/0215462 | A1 * | 8/2009 | Lundh et al. ................... 455/445 |

FOREIGN PATENT DOCUMENTS

| CN | 1398494 | 2/2003 |
| CN | 1913489 | 2/2007 |
| JP | 2003298631 | 10/2003 |
| JP | 2004015761 | 1/2004 |
| WO | WO-2005111638 | 11/2005 |

* cited by examiner

*Primary Examiner* — Kwang B Yao
*Assistant Examiner* — Obaidul Huq
(74) *Attorney, Agent, or Firm* — Slater & Matsil, L.L.P.

(57) ABSTRACT

A method of flow control for an IUB-interface, an apparatus, and a base station are disclosed. The method includes the following steps: a frame loss rate of a service is acquired according to the number of lost frames in a predetermined period. A congestion condition at the IUB-interface is determined according to the frame loss rate. A total bandwidth allocated to users' IUB-interface is adjusted according to a bandwidth reservation margin. It is determined whether congestion occurs at the IUB-interface or not by calculating the frame loss rate in the predetermined period, and a maximum available bandwidth for the users' IUB-interface is adjusted in real time according to the congestion condition. Therefore, congestion can be controlled effectively and the bandwidth of the IUB-interface can be used sufficiently.

15 Claims, 5 Drawing Sheets

METHOD OF FLOW CONTROL FOR IUB-INTERFACE, APPARATUS AND BASE STATION

CROSS-REFERENCE TO RELATED APPLICATIONS

The application is a continuation of International Application No. PCT/CN2007/070462, filed on Aug. 14, 2007, which claims priority to Chinese Patent Application No. 200610062179.9, filed on Aug. 17, 2006 and entitled "METHOD OF FLOW CONTROL FOR IUB-INTERFACE", both of which are hereby incorporated by reference in their entireties.

FIELD OF THE INVENTION

The present invention relates to a field of communication technology, and more particularly to a method of flow control for an IUB-interface, an apparatus and a base station.

BACKGROUND OF THE INVENTION

High Speed Downlink Package Access (HSDPA) is an important characteristic of Version R5 of the Wideband Code Division Multiple Access (WCDMA) technique. Through a series of critical techniques including adaptive modulation and encoding, hybrid automatic retransmission, and fast dispatching by a base station, a downlink high speed data transmission is realized, and further, a downlink throughput rate of a cell is increased. Different from Dedicated CHannel (DCH) in Version R99 that resources of a cell are exclusively occupied by DCH service, the HSDPA service improves the utilization rate of resources of a cell through share of High Speed Physical Downlink Shared CHannel (HS-PDSCH), High Speed Shared Control CHannel (HS-SCCH) and power in a cell.

As a service carried in the HSDPA manner, the data service has a discontinuous transmission characteristic. The base station (NodeB) performs flow controls for the IUB-interface, so as to ensure that a user can obtain a corresponding IUB-interface bandwidth when the user requires a data transmission. In one NodeB, it is needed to further ensure that a sum of the IUB-interface bandwidth occupied by all the users does not exceed a total available IUB-interface bandwidth of the NodeB, that is, through an effective flow control manner, the total IUB-interface bandwidth of the NodeB can be sufficiently utilized.

However, in the actual network, the transmission cost of an IUB-interface is usually relatively high, and in order to save the cost, the IUB-interface bandwidth offered by the operator is always limited. Therefore, the IUB-interface resource usually becomes a bottle neck, and as a result, the available IUB-interface resources of the NodeB cannot satisfy the bandwidth demand of all the users. Thus, during the flow control for the IUB-interface, the following conflict may occur. If the NodeB allocates a large bandwidth to a radio network controller (RNC) when performing flow control for the IUB-interface in order to improve the utilization rate of the IUB-interface resources, it may cause that a sum of the IUB-interface bandwidth allocated to all the users in the NodeB is greater than the practical available bandwidth of the NodeB, that is, the so-called congestion occurs at the IUB-interface. In this case, when a user's data is delivered from the RNC to the NodeB, the data may be discarded, resulting in the data loss. This part of data can only be compensated by the retransmission at the radio link control (RLC) layer, so that the user rate is decreased, and the service quality is deteriorated. In contrast, if it is inclined to ensure the reliability of the data transmission, a conservative strategy needs to be adopted when the NodeB performs flow control for the IUB-interface, so as to ensure that congestion will not occur at the IUB-interface, but the precious IUB-interface bandwidth resources cannot be sufficiently utilized.

The essential reason for the above circumstance lies in the data transmission burst of the data service, and thus it is difficult for the NodeB to accurately control the real bandwidth required by each user at any moment. The HSDPA service is different from the DCH service of Version R99 in which the IUB-interface bandwidth allocation of the DCH service adopts a static manner, which is statically allocating the IUB-interface bandwidth according to the requested rate. In the HSDPA service, the NodeB instructs the RNC to deliver the data according to a certain bandwidth for each queue through a capacity allocation frame manner. Since it takes time to send the capacity allocation frame from the NodeB to the RNC and to deliver the data by the RNC according to the received frame, the NodeB cannot accurately predict the congestion conditions at the IUB-interface at all. In addition, as the services are established and deleted at random, and the changes of the establishment and deletion of the services may result in a variation of the total available IUB-interface bandwidth of the HSDPA service, it further takes some time for a flow control entity of the IUB-interface of the NodeB to make a response to the variation. Finally, when the NodeB sends the capacity allocation frame to the RNC, the IUB-interface bandwidth is defined by three parameters, and the values of the three parameters can only be integers, as a result, certain errors in obtaining the integers are inevitable. The above factors produce obstacles for the NodeB to perform flow control for the IUB-interface.

According to the method in the prior art, when the NodeB performs flow control for the IUB-interface, a part of the practical IUB-interface bandwidth available to the HSDPA users is reserved. Here, it is assumed that the practical IUB-interface bandwidth available to the HSDPA users is a value of A, and the reserved bandwidth is a value of B. When flow control is performed for the IUB-interface, the IUB-interface bandwidth is allocated to each HSDPA user according to the value of A-B. In this manner, a bandwidth allocation margin of the IUB-interface at a capacity of B exists, effectively preventing congestion from occurring at the IUB-interface. The greater the value of B is, the lower the probability that congestion occurs at the IUB-interface is.

Although the above method can effectively prevent the congestion from occurring at the IUB-interface, the utilization rate of the IUB-interface is directly decreased, and as a result, the precious IUB-interface bandwidth resources cannot be sufficiently utilized.

SUMMARY OF THE INVENTION

Accordingly, an embodiment of the present invention is directed to a method of flow control for an IUB-interface, an apparatus, and a base station, which are suitable for eliminating a contradiction between IUB-interface congestion and the utilization rate of an IUB-interface bandwidth, thereby achieving a higher utilization rate of the IUB-interface bandwidth while effectively controlling the IUB-interface congestion.

An embodiment of the present invention provides a method of flow control for an IUB-interface, including the following steps:

acquiring a frame loss rate of a service according to the number of lost frames in a predetermined period;

determining a congestion condition of the IUB-interface according to the frame loss rate; and adjusting a total bandwidth allocated to users' IUB-interface according to the congestion condition and a bandwidth reservation margin.

An embodiment of the present invention provides an apparatus of flow control for an IUB-interface, including:

an acquiring unit, adapted to acquire a frame loss rate of a service according to the number of lost frames in a predetermined period;

a determining unit, adapted to determine a congestion condition of the IUB-interface according to the frame loss rate; and an allocating unit, adapted to adjust a total bandwidth allocated to users' IUB-interface according to a determining result from the determining unit and a bandwidth reservation margin.

An embodiment of the present invention provides a base station, which includes an apparatus of flow control for an IUB-interface according to embodiments of the present invention.

In the embodiments of the present invention, it is determined whether congestion occurs at the IUB-interface or not by calculating the frame loss rate in the predetermined period, and a maximum available bandwidth of the users' IUB-interface is adjusted in real time according to the congestion condition, thereby effectively controlling congestion and meanwhile sufficiently utilizing the IUB-interface bandwidth.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE EMBODIMENTS

In an embodiment, the present invention provides a method of flow control for an IUB-interface. According to the method, a flow control process is dynamically performed at the IUB-interface by effectively determining whether congestion occurs at the IUB-interface or not. Once it is detected that congestion occurs at the IUB-interface, a total IUB-interface bandwidth available to the users is decreased during the subsequent flow control for the IUB. Once the IUB-interface congestion is released, the total IUB-interface bandwidth available to the users is increased. The total IUB bandwidth available to the users is adjusted according to congestion condition of the IUB-interface continuously detected, thereby effectively controlling congestion and meanwhile sufficiently utilizing the IUB-interface bandwidth.

The embodiments of the present invention are further described below with reference to the accompanying drawings. An HSDPA service of a WCDMA system is taken as an example to give detailed descriptions of the solution according to embodiments of the present invention.

The HSDPA service is established by the NodeB under an instruction of the RNC. After the HSDPA service has been established, the RNC delivers data to the NodeB through the IUB-interface in a frame protocol (FP) manner according to the specific situation of the service, in which the data may be delivered through a plurality of FP bearers. As for a certain specific FP bearer, delivered FP frames carry frame sequence number (FSN) parameters. The NodeB determines whether frame loss occurs or not during the delivery process according to the detected continuity of the FSN parameters. If frame loss occurs, the number of lost frames is calculated, and the total frame loss rate on all FP bearers is calculated according to the number of lost frames. According to the frame loss rate, the current congestion condition of the IUB-interface may be determined, and the NodeB performs flow control for the IUB-interface accordingly.

As for a certain base station, the FP frame delivered by the RNC to the NodeB includes FSN parameter for indicating a sequence number of the delivered FP frame on the FP bearer, in which the FSN parameter occupies 4 bits, and falls within a range of 1-15, that is, a maximum sequence number of the FP frame is 15. When the RNC delivers FP frames, the FSN parameters thereof are sequentially filled with sequence numbers beginning from 1 respectively, and then, after reaching 15, they are once again filled with sequence numbers from 1, and so forth. Each time when the RNC delivers a new FP frame, the FSN parameter thereof is filled according to the situation of the currently sent FP frame. Therefore, if a FP frame is discarded before being sent to the NodeB, the NodeB determines whether the FP frame is lost or not by detecting the continuity of the FSN parameters carried by correct FP frames received on FP bearers. An HS-DSCH frame structure is shown in FIG. 3, and an FSN 30 is in the high 4 bits of the second byte.

Figure 3:
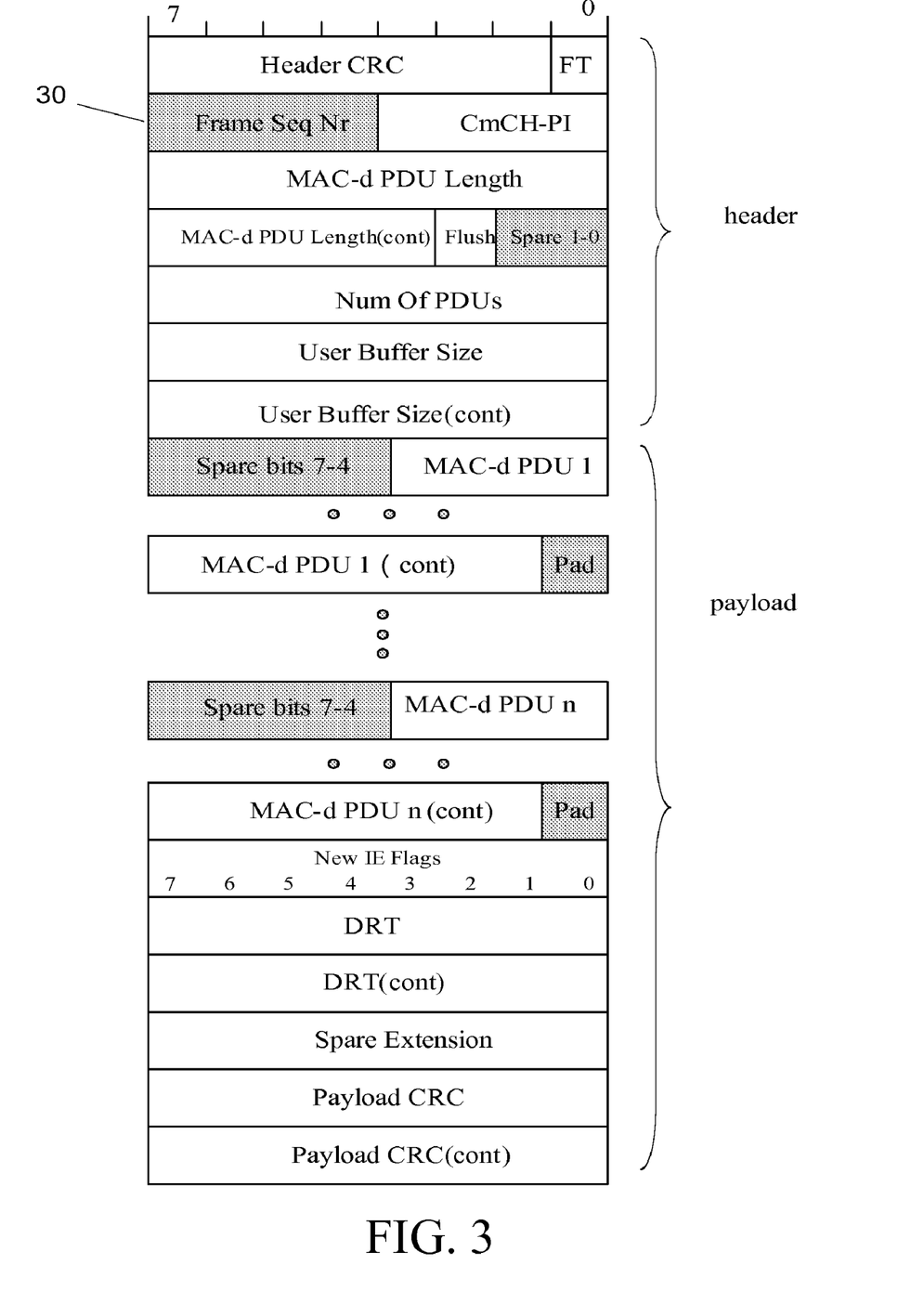
FIG. 3 shows an HS-DSCH frame structure according to an embodiment of the present invention.
Figure 4:
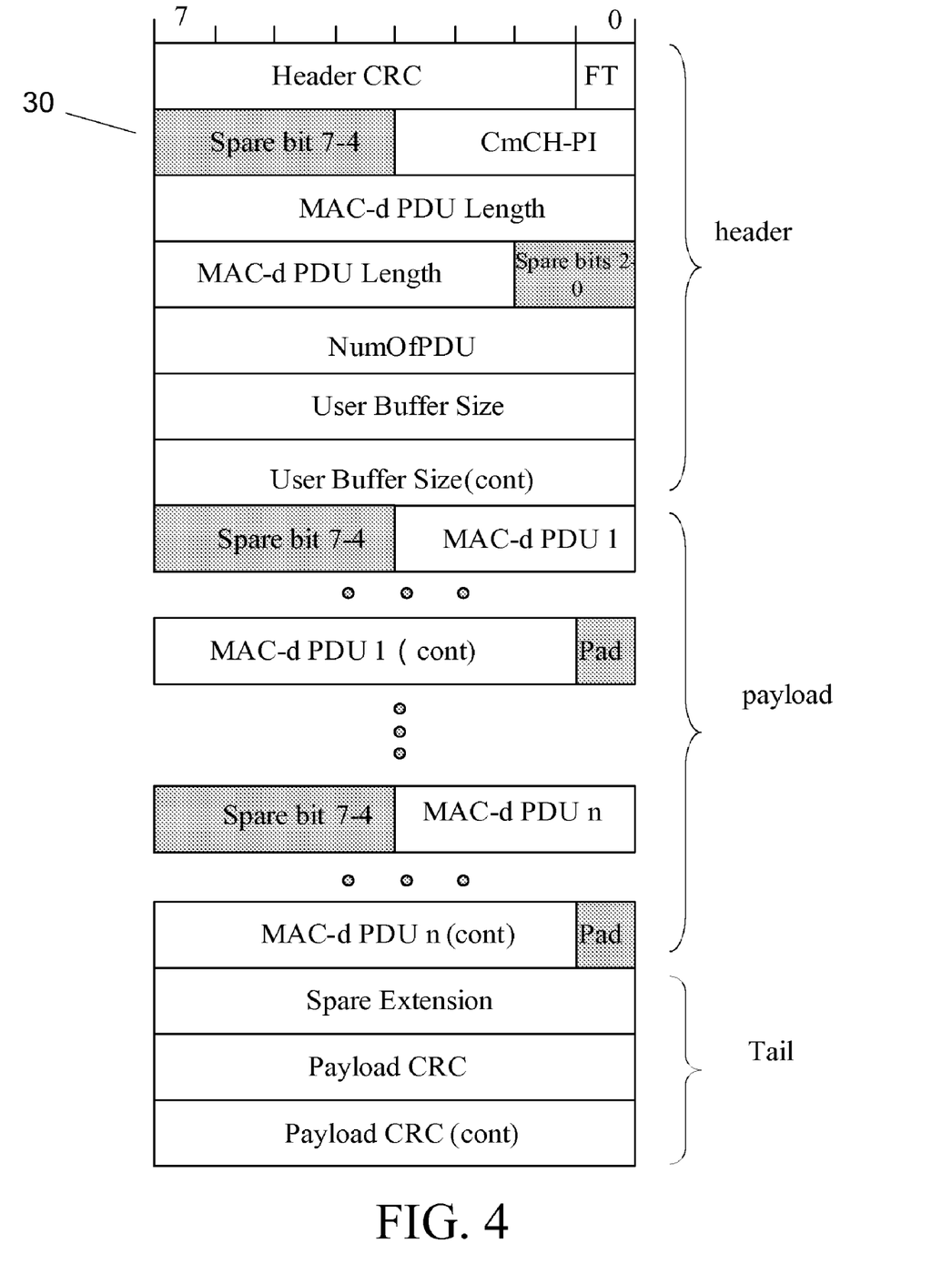
FIG. 4 shows another HS-DSCH frame structure according to an embodiment of the present invention.

As for another base station, which does not support the above FSN parameter, in order to achieve the effect of the embodiments of the present invention, as shown in FIG. 4, the high 4 bits of the second byte may be taken as the FSN 30, which are set in the same way as that of FIG. 3, that is, when the RNC delivers FP frames, FSNs thereof are sequentially filled with sequence numbers beginning from 1, and after reaching 15, they are once again filled with sequence numbers from 1, and so forth.

Figure 1:
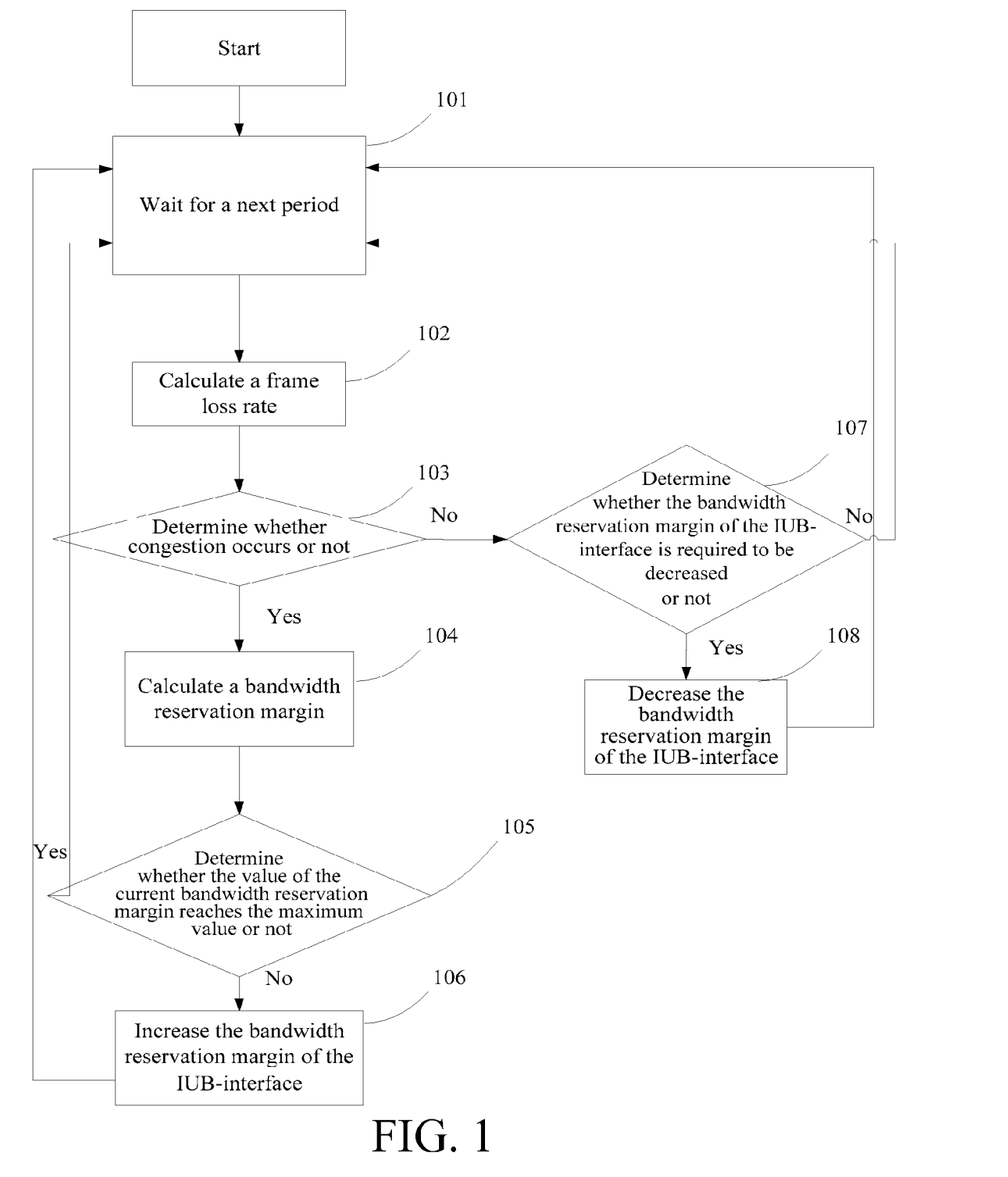
FIG. 1 is a flow chart of performing flow control for an IUB-interface according to an embodiment of the present invention.

Referring to FIG. 1, the flow control process for the IUB-interface according to an embodiment of the present invention includes the following steps.

Before flow control is performed for the IUB-interface, a congestion monitoring period is preset as T.

In 101, the process waits for the congestion monitoring period.

In 102, if the congestion monitoring period comes, a frame loss rate is calculated according to numbers of lost frames on FP bearers.

In 103, it is determined whether congestion occurs at the IUB-interface or not according to the frame loss rate. If it is determined that congestion occurs at the IUB-interface, the process proceeds to 104; otherwise, the process proceeds to 107, so as to enter the next congestion monitoring period.

After the frame loss rate is calculated, it is determined whether congestion occurs or not according to the frame loss rate. Regardless of the adopted IUB-interface transmission manner, a certain probability of frame loss or frame error exists. In order to prevent frame loss caused by reasons of transmission bearers themselves (for example, the frame loss occurs under a situation of no congestion) from being detected, this part of frame loss should be shielded during the determining process. Then, according to different IUB-interface types and characteristics, a congestion-releasing threshold is set as C, and a congestion-generation threshold is further set as D, which is greater than or equal to C. Then, the frame loss rate R is compared with the set threshold, thereby obtaining the current congestion condition of the IUB-interface.

If R>D, it is determined that congestion occurs.

Under a situation that congestion occurs, if R<C, it is determined that congestion disappears; otherwise, it is determined that congestion continues (when D is equal to C, congestion continuance does not occur).

In 104, the value of a current bandwidth reservation margin is calculated as follows.

A total bandwidth available to HSDPA users is set as G, and a practical maximum bandwidth available to the users is set as Z.

A bandwidth reservation margin of an IUB-interface for the HSDPA users is set as L, and an initial value of L is 0. In order to ensure the utilization rate of the IUB bandwidth, a maximum value of L is set as Lmax.

An IUB-interface bandwidth decreased step parameter when congestion occurs is set as J, and an IUB-interface bandwidth increased step parameter when congestion disappears is set as K. The two parameters are respectively adapted to control the decreasing or increasing speed of the HSDPA available bandwidth.

If congestion occurs, L=L+G*R*J.

If congestion disappears, L=L−K.

When L is greater than Lmax, L=Lmax, in which Lmax is smaller than or equal to Z.

When L is smaller than Lmin, L=Lmin, in which Lmin is smaller than Lmax, and Lmin may also be smaller than 0, which means overbooking the HSDPA available bandwidth.

According to the above calculating results, in the following steps, the maximum bandwidth available to the HSDPA users, which is set as W, is adjusted on the basis of W=Z−L in real time according to the congestion condition of the IUB-interface.

In 105, it is determined whether the value of the current bandwidth reservation margin reaches the maximum value or not. If yes, the bandwidth is not adjusted, and the process proceeds to 101, that is, it waits for the next congestion monitoring period; otherwise, the process proceeds to 106.

In 106, after the NodeB increases the bandwidth-reservation abundant volume of the IUB-interface, the process proceeds to 101, that is, the process waits for the next congestion monitoring period.

In 107, it is determined whether the bandwidth reservation margin of the IUB-interface is required to be decreased or not. When the bandwidth reservation margin is greater than the set minimum value, the process proceeds to 108, and when the bandwidth reservation margin is smaller than or equal to the set minimum value, it returns to 101.

In 108, after the bandwidth reservation margin of the IUB-interface is decreased, the process proceeds to 101, that is, it waits for the next congestion monitoring period.

Figure 2:
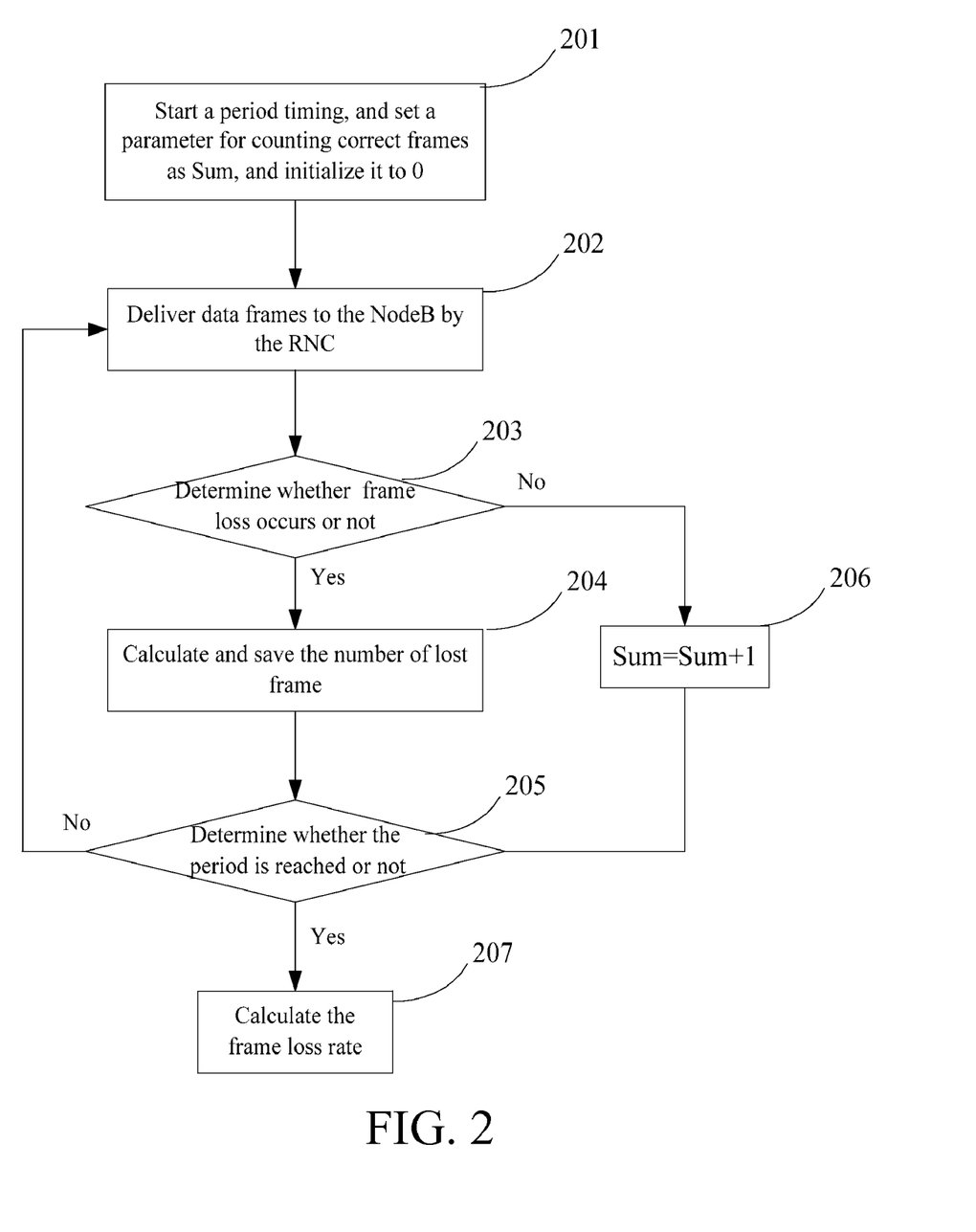
FIG. 2 is a flow chart of calculating a frame loss rate according to an embodiment of the present invention.

Referring to FIG. 2, the process of calculating the frame loss rate includes the steps as follows.

In 201, a period timing is started, and a parameter for counting correct frames is set as Sum, which is initialized to 0 when each period begins.

In 202, the RNC delivers data frames to the NodeB, and each of the delivered data frames carries an FSN parameter.

In 203, it is determined whether a frame loss occurs or not according to the continuity of the FSN parameters. If the FSN parameters are discontinuous, it indicates that the frame loss occurs, and the process proceeds to 204; otherwise, the process proceeds to 206.

In 204, the number of lost frames is calculated and saved.

In 205, it is determined whether the congestion monitoring period is reached or not. If it is determined that the congestion monitoring period is reached, the process proceeds to 207; otherwise, the process proceeds to 202, in which the RNC delivers the next data frame to the NodeB.

In 206, the parameter Sum is added by 1, and the process proceeds to 205.

In 207, according to the numbers of lost frames on all the FP bearers of this congestion monitoring period, the frame loss rate in this congestion monitoring period is calculated.

The process for calculating the frame loss rate is described as follows through a specific example.

It is assumed that the HSDPA service altogether has M FP bearers, which are respectively marked as F1, F2, ..., and FM, and an FSN carried in an ith correct FP frame received on an xth bearer Fx ($1 \leq x \leq M$) is set as FSNx(i). It is further assumed that frame loss occurs when the ith correct FP frame is received, so that the number of lost frames, which is set as Dx(i), is calculated according to the following process.

If i>1, the number of lost frames is:

$D_x(i) = (FSN_x(i) + 15 - FSN_x(i-1)) \% 16$, that is, a remainder of $(FSN_x(i) + 15 - FSN_x(i-1))/16$, in which 15 is the maximum sequence number of FP frames, and 16 is the maximum sequence number of FP frames plus 1.

$$\text{If } i=1, D_x(1) = FSN_x(1) - 1.$$

It is assumed that totally Zx correct FP frames are received on the xth bearer Fx in the congestion monitoring period T of the IUB-interface, the total number of lost frames on the Fx in the congestion monitoring period, which is set as $E_x$, is:

$$E_x = D_x(1) + D_x(2) + D_x(3) + \ldots + D_x(Z_x).$$

It can be calculated that, the total number of lost frames on M FP bearers in the congestion detecting period T, which is set as B, is:

$$B = E_1 + E_2 + E_3 + \ldots + E_M.$$

In the period T, totally Zx correct FP frames are received on the xth bearer Fx, so the total number of correct FP frames received on the M FP bearers in this period, which is set as A, is:

$$A = Z_1 + Z_2 + Z_3 + \ldots + Z_M.$$

According to the above calculating results, the frame loss rate on all the bearers of the HSDPA service in this congestion period, which is set as R, is:

$$R = B/(A+B).$$

Figure 5:
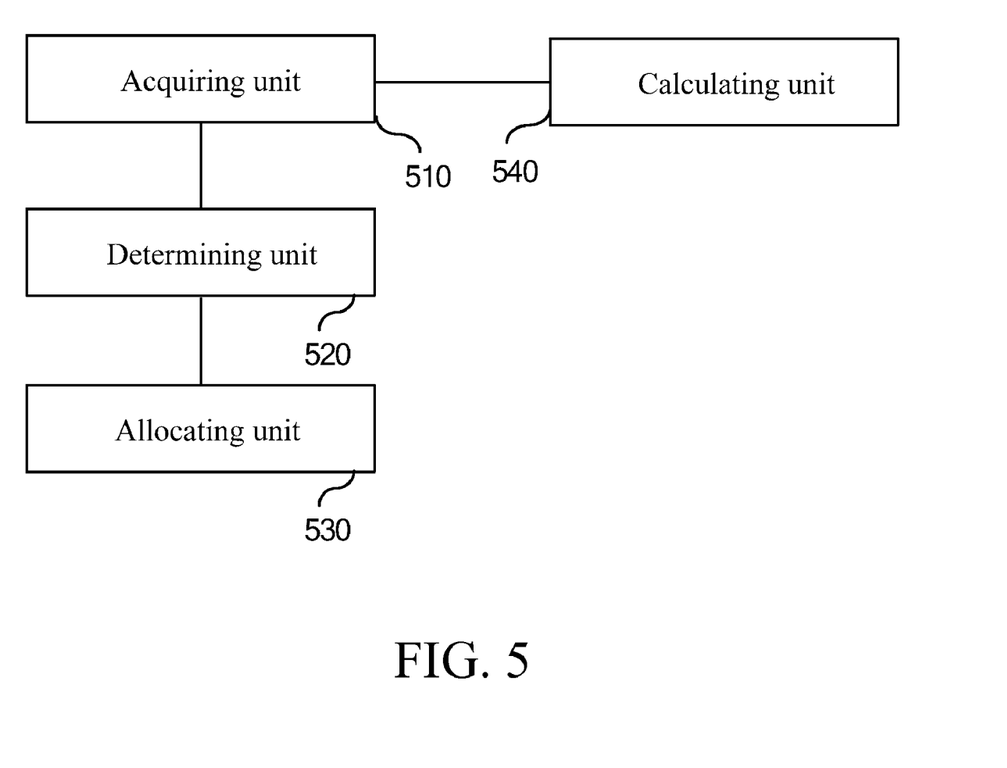
FIG. 5 is a block diagram of an apparatus of flow control for an IUB-interface according to an embodiment of the present invention.

FIG. 5 is a block diagram of an apparatus of flow control for an IUB-interface according to an embodiment of the present invention. Referring to FIG. 5, the apparatus includes an acquiring unit 510, a determining unit 520, and an allocating unit 530.

The acquiring unit 510 is adapted to acquire a frame loss rate of a service according to the number of lost frames in a predetermined period.

The determining unit 520 is adapted to determine congestion condition of the IUB-interface according to the frame loss rate.

The allocating unit 530 is adapted to adjust a total bandwidth allocated to the user's IUB-interface according to a determining result from the determining unit 520 and a bandwidth reservation margin.

In addition, based on the above embodiment, the apparatus may further include a calculating unit 540, adapted to calculate a value of a current bandwidth-reservation margin.

The determining unit 520 further includes a first determining sub-unit and a second determining sub-unit.

The first determining sub-unit is adapted to compare the frame loss rate with a predetermined congestion-generation threshold value, and determine that congestion occurs at the IUB-interface, if the frame loss rate is greater than the predetermined congestion-generation threshold value.

The second determining sub-unit is adapted to compare the frame loss rate with a predetermined congestion-releasing threshold value, and determine that congestion disappears at the IUB-interface, if the frame loss rate is smaller than the predetermined congestion-releasing threshold value.

The allocating unit 530 further includes a first allocating sub-unit and a second allocating sub-unit.

The first allocating sub-unit is adapted to increase a bandwidth reservation margin, which is set as L, of the IUB-interface by a certain increment, when congestion occurs at the IUB-interface and the value of the current bandwidth reservation margin calculated by the calculating unit is smaller than a maximum value, in which the certain increment thereof is a product of a total available bandwidth which is set as G, an IUB bandwidth decreased step parameter which is set as J when congestion occurs, and the frame loss rate.

The second allocating sub-unit is adapted to decrease the bandwidth reservation margin L of the IUB-interface by a certain decrement, when congestion disappears at the IUB-interface and the bandwidth reservation margin is greater than a set minimum value, in which the certain decrement thereof is an IUB bandwidth increased step parameter which is set as K when congestion disappears.

In the embodiments of the present invention, the apparatus of flow control for the IUB-interface may be set in the NodeB, and the application process is described as follows.

A HSDPA service is established by the NodeB under an instruction of the RNC. After the HSDPA service has been established, the RNC delivers the data to the NodeB through the IUB-interface in a FP manner according to a specific situation of the HSDPA service. As for a specific FP bearer, the delivered FP frames carry FSN parameters. The NodeB determines whether frame loss occurs or not during the delivery process according to the continuity of the FSN parameters detected by the detecting unit. If frame loss occurs, the number of lost frames is calculated by the acquiring unit, and a total frame loss rate on all the FP bearers is calculated according to the number of lost frames. According to the frame loss rate, the current congestion condition of the IUB-interface may be determined by the determining unit, and accordingly, the allocating unit of the NodeB performs flow control for the IUB-interface. When congestion occurs at the current IUB-interface, the current bandwidth reservation margin is calculated by the calculating unit, and it is determined whether the current bandwidth reservation margin reaches the maximum value or not. If not, the bandwidth reservation margin of the IUB-interface is increased; otherwise, it waits for the next period. When congestion does not occur at the current IUB-interface, it is determined whether the bandwidth reservation margin of the IUB-interface is required to be decreased or not. If yes, the bandwidth reservation margin of the IUB-interface is decreased; otherwise, it waits for the next period. As for the detailed process for calculating the frame loss rate and the specific increment or decrement of the bandwidth-reservation margin of the IUB-interface may be obtained with reference to the above embodiments, which thus will not be described here.

To sum up, in the embodiments of the present invention, it is determined whether congestion occurs or not by detecting the frame loss rate on the FP bearers. Once it is determined that congestion occurs at the IUB-interface, a total IUB bandwidth available to all the HSDPA users is decreased during the flow control process for the IUB interface, and once the congestion is released at the IUB-interface, the total IUB bandwidth available to all the HSDPA users is increased. By means of continuously detecting the congestion condition of the IUB-interface during the flow control process for the IUB interface, the IUB bandwidth available to the HSDPA users is periodically adjusted according to the congestion condition, thereby effectively controlling congestion and sufficiently utilizing the IUB-interface bandwidth.

It will be apparent to those skilled in the art that various modifications and variations can be made to the present invention without departing from the scope or spirit of the invention. In view of the foregoing, it is intended that the present invention covers modifications and variations of this invention provided that they fall within the scope of the following claims and their equivalents.

What is claimed is:

1. A method of flow control for an IUB-interface, comprising:

acquiring a frame loss rate of a service according to the number of lost frames in a predetermined period;

determining a congestion condition at the IUB-interface according to the frame loss rate wherein the congestion condition is congestion occurs or congestion disappears; and adjusting a total bandwidth allocated to the IUB-interface according to the congestion condition, wherein adjusting the total bandwidth according to the congestion condition comprises:

based on the congestion condition, determining a bandwidth reservation margin; and adjusting the total bandwidth allocated to the IUB-interface according to the bandwidth reservation margin, wherein the total bandwidth is a value obtained by subtracting the bandwidth reservation margin from a maximum total bandwidth of the IUB-interface;

wherein the adjusting the total bandwidth allocated to the IUB-interface according to the bandwidth reservation margin comprises: adjusting the total bandwidth allocated to the IUB-interface according to the bandwidth reservation margin through increasing the bandwidth-reservation margin L of the IUB-interface by an increment if congestion occurs at the IUB-interface, wherein the increment is a product of a total bandwidth available to high speed downlink package access (HSDPA) users G, an IUB bandwidth decreased step parameter J, and the frame loss rate; or, adjusting the total bandwidth allocated to the IUB-interface according to the bandwidth reservation margin through decreasing the bandwidth reservation margin L of the IUB-interface by a decrement if congestion disappears at the IUB-interface, wherein the decrement is an IUB bandwidth increased step parameter K.

2. The method according to claim 1, wherein the determining the congestion condition at the IUB-interface comprises:

determining the congestion condition by comparing the frame loss rate with a predetermined congestion-generation threshold value or a predetermined congestion-releasing threshold value, wherein if the frame loss rate is greater than the predetermined congestion-generation threshold value, the congestion condition is: congestion occurs; or if the frame loss rate is smaller than the predetermined congestion-releasing threshold value, the congestion condition is: congestion disappears.

3. The method according to claim 2, wherein the congestion-generation threshold value is greater than or equal to the congestion-releasing threshold value.

4. The method according to claim 1, wherein before the acquiring the frame loss rate of the service according to the number of lost frames in the predetermined period, the method further comprises:

delivering, by a radio network controller (RNC), a frame protocol (FP) frame to a NodeB through the IUB-interface, wherein the delivered FP frame carries a frame sequence number (FSN) parameter.

5. The method according to claim 4, wherein the acquiring the frame loss rate of the service according to the number of lost frames in the predetermined period comprises:

determining, by the NodeB, whether a frame loss occurs or not by detecting a continuity of the FSN parameter carried by each FP frame, and if the frame loss occurs, calculating the number of lost frames, and calculating a total frame loss rate on all FP bearers in the predetermined period according to a total number of lost frames and a total number of correct frames received on all the FP bearers.

6. The method according to claim 5, wherein the calculating the number of lost frames is respectively performed for each FP bearer, and the calculating the number of lost frames for each FP bearer comprises:

if the number of the correct frames received on the FP bearer is greater than 1, the number of lost frames between two motions of continuously receiving correct frames is: a remainder of (the FSN parameter value carried by the correct frame received this time−the FSN parameter value carried by the correct frame received last time+a maximum sequence number of the FP frame)/(the maximum sequence number of the FP frame+1), or, if the number of the correct frames received on the FP bearer is only 1, the number of lost frames is: the FSN parameter value carried by the correct frame received this time−1; and the total number of lost frames on the FP bearer is a sum of the numbers of lost frames on the bearer, and the total number of lost frames in the whole service is a sum of the numbers of lost frames on all the FP bearers.

7. The method according to claim 1, wherein the adjusting the total bandwidth allocated to the IUB-interface according to the bandwidth reservation margin further comprises:

setting a maximum value and a minimum value of the bandwidth reservation margin L of the IUB-interface as $L_{max}$ and $L_{min}$ respectively; setting L to $L_{max}$ if L is greater than $L_{max}$, and setting L to $L_{min}$ if L is smaller than $L_{min}$.

8. An apparatus of flow control for an IUB-interface, comprising:

an acquiring unit, configured to acquire a frame loss rate of a service according to the number of lost frames in a predetermined period;

a determining unit, configured to determine a congestion condition of the IUB-interface according to the frame loss rate; and an allocating unit, configured to adjust a total bandwidth allocated to the IUB-interface according to the congestion condition, wherein in adjusting the total bandwidth allocated to the IUB-interface, the allocating unit is configured to determine a bandwidth reservation margin based on the congestion condition, and adjust the total bandwidth allocated to the IUB-interface according to the bandwidth reservation margin, wherein the total bandwidth is a value obtained by subtracting the bandwidth reservation margin from a maximum total bandwidth of the IUB-interface;

wherein the congestion condition is congestion occurs or congestion disappears, and the adjusting unit is further configured to:

adjust the total bandwidth allocated to the IUB-interface according to the bandwidth reservation margin through increasing the bandwidth reservation margin L of the IUB-interface by an increment, if congestion occurs at the IUB-interface and the bandwidth reservation margin calculated by the calculating unit is smaller than a preset maximum value, wherein the increment is a product of a total bandwidth available to high speed downlink package access (HSDPA) users G, an IUB bandwidth decreased step parameter J, and the frame loss rate; or adjust the total bandwidth allocated to the IUB-interface through according to the bandwidth reservation margin through decreasing the bandwidth reservation margin L of the IUB-interface by a decrement, if congestion disappears at the IUB-interface and the bandwidth-reservation margin is greater than a preset minimum value, wherein the decrement is an IUB bandwidth increased step parameter K.

9. The apparatus according to claim 8, wherein the determining unit is further configured to determine the congestion condition by comparing the frame loss rate with a predetermined congestion-generation threshold value or a predetermined congestion-releasing threshold value, wherein if the frame loss rate is greater than the predetermined congestion-generation threshold value, the congestion condition is: congestion occurs; or if the frame loss rate is smaller than the predetermined congestion-releasing threshold value, the congestion condition is: congestion disappears.

10. The apparatus according to claim 8, further comprising a calculating unit, configured to calculate the bandwidth reservation margin.

11. The apparatus according to claim 8, further comprising:

a detecting unit, configured to periodically detect a continuity of a frame sequence number (FSN) parameter carried by each frame protocol (FP) frame, and calculate the number of lost frames, wherein the acquiring unit is further configured to calculate a total frame loss rate on all FP bearers in the predetermined period according to a total number of lost frames in the predetermined period and a total number of correct frames received on all the FP bearers obtained by the detecting unit.

12. A base station, comprising:

an acquiring unit, configured to acquire a frame loss rate of a service according to the number of lost frames in a predetermined period;

a determining unit, configured to determine a congestion condition of a IUB-interface according to the frame loss rate; and an allocating unit, configured to adjust a total bandwidth allocated to the IUB-interface according to the congestion condition, wherein in adjusting the total bandwidth allocated to the IUB-interface, the allocating unit is configured to determine a bandwidth reservation margin based on the congestion condition, and adjust the total bandwidth allocated to the IUB-interface according to the bandwidth reservation margin, wherein the total bandwidth is a value obtained by subtracting the bandwidth reservation margin from a maximum total bandwidth of the IUB-interface;

wherein the congestion condition is congestion occurs or congestion disappears, and the allocating adjusting unit is further configured to:

adjust the total bandwidth allocated to the IUB-interface according to the bandwidth reservation margin through increasing the bandwidth reservation margin L of the IUB-interface by an increment, if congestion occurs at the IUB-interface and the bandwidth reservation margin calculated by the calculating unit is smaller than a preset maximum value, wherein the increment is a product of a total bandwidth available to high speed downlink package access (HSDPA) users G, an IUB bandwidth decreased step parameter J, and the frame loss rate; or adjust the total bandwidth allocated to the IUB-interface through according to the bandwidth reservation margin through decreasing the bandwidth reservation margin L of the IUB-interface by a decrement, if congestion disappears at the IUB-interface and the bandwidth reservation margin is greater than a preset minimum value, wherein the decrement is an IUB bandwidth increased step parameter K.

13. The base station according to claim 12, wherein the determining unit is further configured to determine the congestion condition by comparing the frame loss rate with a predetermined congestion-generation threshold value or a predetermined congestion-releasing threshold value, wherein if the frame loss rate is greater than the predetermined congestion-generation threshold value, the congestion condition is: congestion occurs; or, if the frame loss rate is smaller than the predetermined congestion-releasing threshold value, the congestion condition is: congestion disappears.

14. The base station according to claim 12, further comprising a calculating unit, configured to calculate the bandwidth reservation margin.

15. The base station according to claim 12, further comprising:

a detecting unit, configured to periodically detect a continuity of a frame sequence number (FSN) parameter carried by each frame protocol (FP) frame, and calculate the number of lost frames, wherein the acquiring unit is further configured to calculate a total frame loss rate on all FP bearers in the predetermined period according to a total number of lost frames in the predetermined period and a total number of correct frames received on all the FP bearers obtained by the detecting unit.

* * * * *